April 23, 1957  C. E. JAHNIG ET AL  2,789,696
TREATING HYDROCARBON OILS
Filed Dec. 30, 1952  2 Sheets-Sheet 1

Charles E. Jahnig
Arnold F. Kaulakis
Raymond W. Winkler
Inventors
By George J Silbey Attorney April 23, 1957 C. E. JAHNIG ET AL 2,789,696
TREATING HYDROCARBON OILS
Filed Dec. 30, 1952 2 Sheets-Sheet 2

Charles E. Jahnig
Arnold F. Kaulakis Inventors
Raymond W. Winkler
By George J. Hilary Attorney

United States Patent Office 2,789,696
Patented Apr. 23, 1957

2,789,696

TREATING HYDROCARBON OILS

Charles E. Jahnig, Red Bank, Arnold F. Kaulakis, Chatham, and Raymond W. Winkler, Westfield, N. J., assignors to Esso Research and Engineering Company, a corporation of Delaware Application December 30, 1952, Serial No. 328,547

8 Claims. (Cl. 210—80)

This invention relates to methods and apparatus for treating hydrocarbon oils to remove impurities therefrom and more particularly relates to removing catalyst contaminants from hydrocarbon oil feeds by filtration.

In catalytic cracking processes it is known that certain metals or metal compounds which are present in hydrocarbon feedstocks, such as iron, sodium, nickel, vanadium, etc., are harmful to catalysts. A catalyst contaminated in this way produces more coke and gas at the expense of valuable gasoline and heating oil fractions.

Metallic impurities such as oil-soluble, metallo-organic compounds are present in the hydrocarbon oil feed and it is thought they are formed by corrosion of pipe lines through which the oil is passed and tanks in which the oil is stored, by naphthenic and other type acids or corrosive agents present in the oil feed stock. Some may also be present due to carry-over or entrainment in pipe stills of contaminants originally present in the oil.

According to the present invention a column or vertically arranged vessel is provided containing a series of supported horizontally extending screen or perforated trays arranged one above the other in spaced relation. The trays extend entirely across the vessel. Relatively shallow beds of finely divided solid filtering material are formed on each tray. The hydrocarbon oil may be a crude or a residuum or a distillate oil such as gas oil or any oil having an initial boiling point above about 450° F. The oil is heated and pumped under superatmospheric pressure through a plurality of horizontally arranged tubes or pipes which are arranged between the trays to feed the hydrocarbon oil into the space between the trays.

The oil passes up through the bottom portion of the tray arranged above the particular oil inlet pipe or pipes and through the top portion of the tray arranged below the same oil inlet pipe or pipes and filtered oil is removed from the center of each bed by means of an outlet pipe or pipes disposed or submerged in each of the beds.

Filtered oil is removed through the outlet pipe means and is preferably passed directly to a catalytic cracking unit as feed stock for the unit. During filtration the ash and other catalyst contaminants are effectively removed. Preferably screens or the like are placed over the perforated pipes.

Filter cakes are formed on the top and bottom surfaces of each filtering bed, and as the filtering proceeds the pressure drop across the filter beds increases and finally becomes excessive. When the pressure drop becomes excessive the filtration is terminated, the pressure on the vessel is released and the oil is drained from the vessel. The filter beds are then agitated with steam or other hot gases to fluidize the filter beds and break up the filter cakes. The contaminated filter cake particles may be completely elutriated from each bed. Steam or other fluid may be used to disperse the filter cake particles within each filter bed.

Alternatively, the filter beds may be reconditioned by backwashing or flushing with a liquid stream such as oil, naphtha, aromatics such as benzene, water and/or alcohol, etc. By using a liquid which tends to disperse the filter cake, the filter cake particles can be passed upward through the beds above, and out of the vessel. This wash liquid may be recirculated to the vessel at a high rate to agitate and fluidize the filter beds and can pass through a settler, filter, still, etc. to remove the contaminant particles and provide clear wash liquid for recirculation, or for the next wash cycle.

The filter beds are reformed by allowing them to settle before proceeding with the next filtration step. Provision is made for draining the oil from the vessel before introduction of the steam or other fluid and provision is also made for charging and discharging the filtering material from the vessel. The filtering material is preferably sand but other materials may be used, such as diatomaceous earth, spent cracking catalyst, refractory alumina, clay, filter aid, etc.

Periodic replacement of the filter material is necessary after the filtering material has been used for a number of filtration steps. All of the sand may be removed and replaced by new sand, or incremental addition of sand may be used by adding new layers of sand with blowback steam after removal of some used sand by sand drains during blowback.

According to this invention the filtering operation has the advantage of high temperature operation, and also relatively high pressure drops may be tolerated. By heating the relatively heavy hydrocarbon oil to an elevated temperature, the viscosity of the oil is greatly reduced so that it flows much better than the same oil at a lower temperature.

Another advantage is that some asphaltic material, not deleterious in the filtered oil, does not collect with the cake when filtering at the higher temperature. However, this material may precipitate out at a lower temperature below about 300° F. and contribute to plugging of the filter. It follows that filtration at the higher temperature allows increased life of filter before blowback and/or higher filtration rates.

The high permissible pressure drop is possible because of the mechanical rigidity of the filtering apparatus and because filtration flow is from both sides of the cake in toward the center. Thus the pressure drop is exerted against the filter bed itself, rather than against a supporting screen. The bed can be made up of particles with suitable mechanical strength. Moreover, in the design the pressures above and beneath all the sand beds are substantially equalized, so that only minor forces are imposed against the flat plate supporting the filter bed. In addition a large filter area per unit of vessel volume is obtained. Because of these features, the filtration step can be carried out for a relatively long time before blowback or agitation of the filter beds is required.

Figure 1:
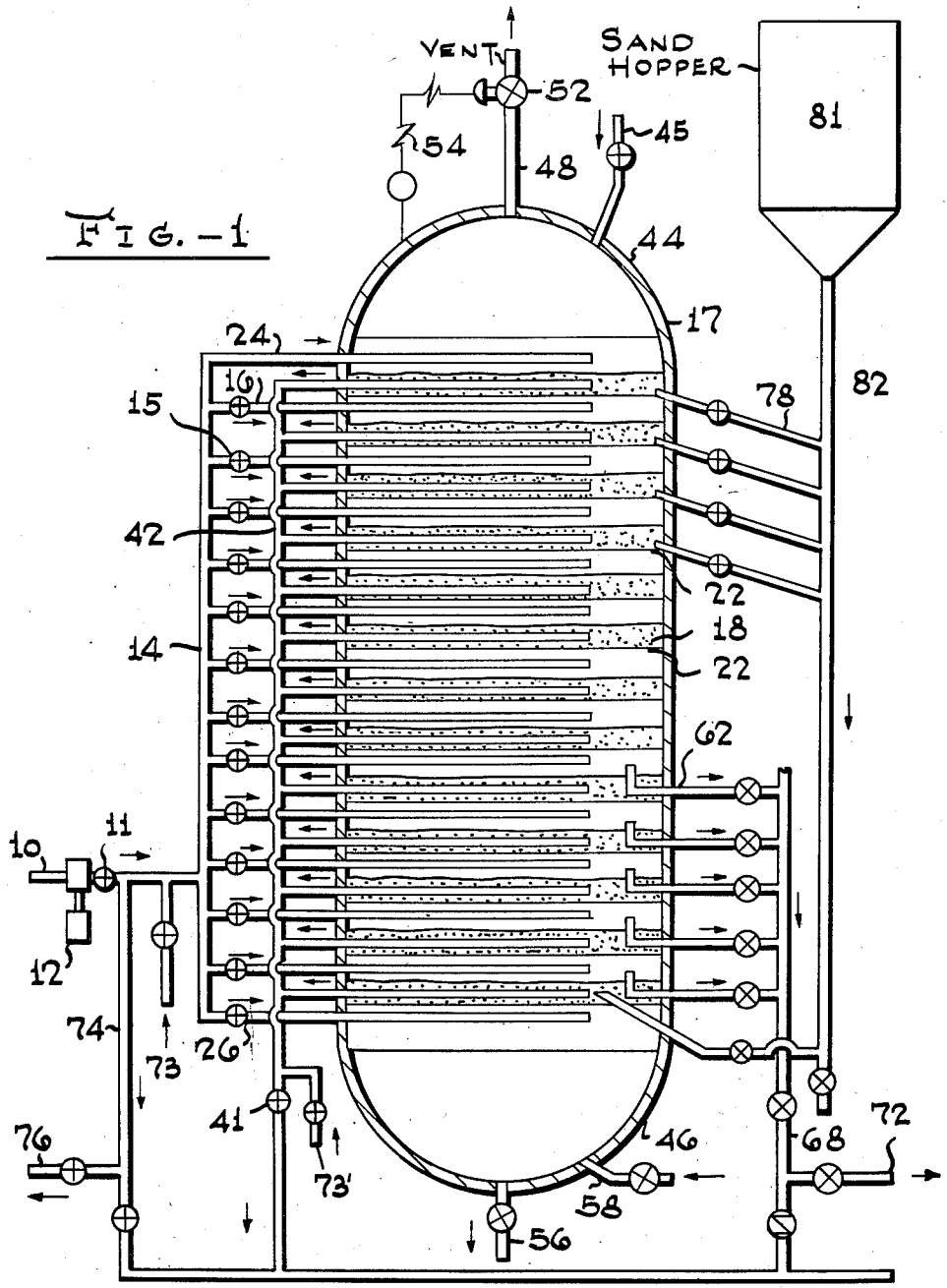
Fig. 1 represents a front elevation of one form of apparatus adapted for practicing the present invention.

Referring now to the drawing the reference character 10 designates a feed line having a valve 11 through which oil to be treated is passed by pump 12 under a pressure of up to about 100 to 250 p. s. i. g. (pounds per square inch gage). The oil to be treated is preferably a catalytic cracking feedstock such as heavy gas oil, West Texas, Louisiana, South American and the like or mixtures thereof. The initial boiling point of light gas oil is about 450° F. The typical ash content is about 2–15 p. t. b. (pounds per thousand barrels). The oil is heated to a temperature of 400° to 650° F. and is preferably hot enough so that any water present will be vaporized and precipitate out water soluble salt so that they will be removed by filtration. The heated oil is introduced into vertical manifold 14 communicating with a plurality of inlet pipes 16 containing valves 15 which extend into the vessel 17 and into the space between beds of filtering material 18 (Figure 2) supported on screen or perforating trays 22. The trays 22 and bed 18 are arranged horizontally in the vessel 17 and extend entirely across the vessel. The trays 22 and beds 18 are arranged one above the other in spaced relation for substantially the entire length of the vessel 17. The top inlet pipe 24 is arranged above the top filter bed 18 and the bottom inlet pipe 26 extends into the vessel below the bottom filtering bed.

Figure 4:
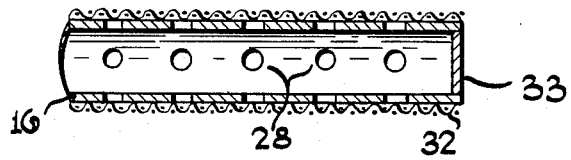
Fig. 4 represents an enlarged detail of a portion of the outlet pipe which is normally imbedded in the filtering material on the tray.
Figure 2:
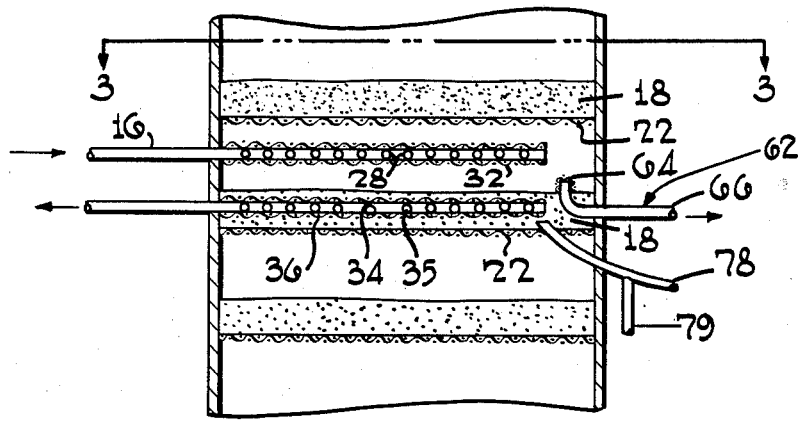
Fig. 2 represents a detail showing the arrangement of the inlet and outlet pipes for the oil and the drain pipes for oil and filtering material.

The inlet pipes 16, 24 and 26 are perforated as shown at 28 in Fig. 2 and preferably a screen or the like 32 is disposed around the outside of the inlet pipes over the perforations. The ends of the inlet pipes 16 as shown at 33 in Fig. 4 are imperforate.

Figure 3:
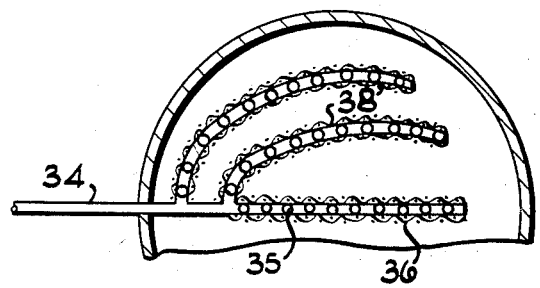
Fig. 3 represents a sectional detail taken on line 3—3 of Fig. 2 with the filtering material and supporting screen omitted to more clearly show the outlet pipe.

Arranged within each filtering bed are outlet pipe means 34 (Fig. 2), which pipes are provided with a plurality of perforations 35 and a screen or the like covering 36 for the outlet pipes. As shown in Fig. 3 the outlet pipe means comprises a plurality of pipes 38 arranged to extend for substantially the entire width of the vessel 17 into different portions of the filtering bed on each tray. Preferably the ends of the pipes 38 are closed off or imperforate. The outlet pipe means 34 leads to outlet manifold 42 for withdrawing filtered oil from the vessel 17, and as this oil is at an elevated temperature it is preferably passed directly to a catalytic cracking unit to utilize the heat contained in the oil. The vessel 17 is shown as a vertical cylindrical column provided with a rounded top potion 44 and a rounded bottom portion 46 but other shapes may be used. A vent line 48 extends from the top of the vessel 17 and is provided with a safety valve 52 to release the pressure in excess of that safe for the apparatus. Associated with the safety valve 52 is a pressure indicator 54. If desired, valve 52 may be of the automatic control type adapted to hold a certain pressure in vessel 17. The bottom of the vessel 17 is provided with a valved drain 56 and a valved gas inlet line 58 for the introduction of steam or other fluid following a filtration step.

After the filter has been used for some time the pressure drop across the filter beds becomes excessive and the filtration step is then stopped. During filtration filter cake is formed on the bottom and top sides on each of the filtering beds and this is what causes the increase in pressure drop through the vessel. Excess oil remaining in the vessel 17 is drained through a plurality of drain pipes 62 each of which extends into the space between the filtering beds. These drain pipes are shown generally in Fig. 1 and in greater detail in Fig. 2 and include a vertical perforated portion 62 covered by a screen or the like 64. The drain pipes have a horizontal section 66 which extends through the wall of the column 17 and lead into drain manifold 68. From the drain manifold the oil may be passed to the catalytic cracking unit but is preferably withdrawn from the system through line 72 and again passed through the vessel 17 when the next filtration step is started. For economy or other reasons it may be preferred to omit drain connections 62 and allow the oil to drain to bottom outlet 56 after the filter cycle. To facilitate this, gas pressure can be applied at the top of vessel 17 through a connection 45. The oil from the bottom of the vessel 17 is also drained through bottom outlet 56 and is again passed through vessel 17 when the next filtration step is started. If this bottom drain oil is too high in ash content it may be discarded. In order to complete the draining of the vessel, the vessel is purged by means of steam introduced into feed line 10 and manifold 14 while the vessel is still pressurized. When completely drained (now full of steam), pressure in vessel 17 is realesed by opening valve 52.

The filter beds are then regenerated or remade by agitating by means of superheated steam or other suitable gas or liquid medium. The gaseous or liquid agitating means is introduced into vessel 17 in several ways. One way is to introduce the agitating means through line 58. Under conditions wherein this method would not permit agitation of the upper trays, additional fluid agitating means are introduced through line 14 via line 73, into the space between each individual tray. Additional amounts of the agitating means may also be introduced through manifold 42 via line 73' to provide additional agitation of the individual beds. Or the beds of filtering material 18 may be regenerated by introducing the agitating fluid between the beds by pipes 16 and 26. The steam or other fluid passes upwardly through the filtering beds at a superficial velocity of about 0.5 to 4.0 feet per second to agitate the beds and break up the filter cakes on the top and bottom portions of each filtering bed. Due to the agitation the broken filter cake particles are dispersed within the beds. With the gaseous agitating means, exceedingly good mixing of the beds is obtained to break up the filter cake and to clean off the filter cake adhering to the bottom portions of the screened trays.

Instead of dispersing the filter cake particles in the filter beds the operation can be carried out to elutriate the small contaminant filter cake particles from the beds by employing sufficient gas velocity to carry them out through line 48.

After the remaking of the filter beds, the beds are allowed to settle and pressure is again applied to vessel 17 by closing all drain and vent valves, opening the feed and slowly opening valve in line 42 and the vessel is again put on a filtration step. When the filtration step is stopped the feed oil from line 10 is passed through by-pass line 74 and may be passed directly to the catalytic cracking unit but is preferably passed through line 76 to another similar filtering vessel 17 so that the filtration can be continuous while the filter beds in the first vessel 17 are being regenerated.

After the filtering beds have been in use for some time and after a number of regenerations or remakings, replacement of all the filtering beds will be necessary. Drain pipes 78 are shown generally at the top of Fig. 1 and in greater detail in Fig. 2. The drain pipes 78 for the sand or the like are shown as extending through the tray of each bed and through the wall of the vessel 17 so that when the valves in the drain pipes 78 are opened the sand or other filtering material will be withdrawn through the drain pipes 78. The sand is removed through drain pipes 78 while the beds are in a state of agitation. Some aeration as by line 79 may be necessary in order to maintain the solid in a fluidized state. This is provided for as shown in Fig. 2. Substantially all of the sand may be withdrawn in this manner. The screens 22 may be tilted slightly toward drain pipes 78 to allow complete removal of sand from the beds. The withdrawn sand is passed into manifold 82 and discarded from the system. Fig. 1 omits some of the sand drain pipes but includes the upper ones and the bottom drain pipe for the lowermost filter bed. In some cases the sand may be removed better by flushing out with liquid oil, water, etc. After all the filtering material is removed from the trays a clean batch of sand or other filter material is introduced into the vessel to form beds on each of the trays 22. This is done by flowing sand from the hopper 81 through line 82. With the aeration provided in lines 78 as shown the sand is blown from line 82 through line 79 onto each individual plate.

Complete replacement of the sand bed may not be necessary. Small amounts of clean sand may be added during the blowback cycle through the line 82. Before adding the clean sand, an equivalent amount of the used sand is drained through lines 78 to manifold 82 while the beds are in a state of agitation. Some aeration of line 78 may be necessary in order to maintain flow of the solid in the line. This is provided for as shown in Fig. 2.

The effectiveness of filtration is related to the porosity of the filtering material and when sand is used the porosity of the filtering bed is determined by the sand particle size. A sand or other granular material is selected so that the particles are in the range of about 35 to 50 microns, to give a filter bed porosity of about 5 microns with the sand particles being closely packed. Filter beds having a particle size of about 50-90 microns will remove about 90% of the iron contaminants in a typical gas oil feed. Using sand particles of about 100 to 125 micron size will give a filter bed of about 15 micron porosity, which is not as efficient in the removal of iron contaminants from hydrocarbon feed oil as is the 5 micron porosity bed, although it gives longer life and is adequate in some cases. Average sand particle size may be between about 25 and 150 microns, the preferred range being 50-90 microns. The size range of the cut is preferably relatively narrow, such as may be obtained by screening.

In carrying out the filtration step the major portion of the pressure drop is produced by the filter cakes formed on the bottom and top portions of the filter beds 18. The pressure drop through the sand beds itself is not a major factor in the filtering step. As the filter cakes build up on the filtering beds there will be increase in pressure drop and this pressure drop may become more than about 100 p. s. i. The filter beds are remade by agitation to break up the filter cakes and to disperse the filter cake particles within the sand beds. These particles are retained in the sand bed, and accumulate over a number of filtering cycles, until it becomes necessary to flush them out up upflow washing or the sand bed may be replaced. Since the volume of the filter cake particles to the sand beds is very small, substantially none of the dispersed filter cake particles will be washed into the filtrate during the next filtering cycle and they will not cause excessive pressure drop.

A description of the process will now be given. Gas oil such as West Texas, Louisiana, South American, at a temperature of about 400° to 650° F. and under a superatmospheric pressure of about 100 to 250 p. s. i. g. is passed through line 10 by pump 12. The oil is passed through manifold 14 and inlet pipes 16, 24 and 26 into the vessel 17 between the trays 22 and above and below the topmost filter bed and the lowermost filter bed. A pool of oil is formed between the filter beds and above the top filter bed and below the bottom filter bed. Oil passes from an inlet pipe 16 through the perforated plate 22 above the inlet pipe and into the bottom portion of the filter bed 18. Another portion of the oil passes down through the upper surface of the next lower filter bed 18 and this occurs throughout the vessel 17 so that oil to be filtered passes upwardly through the bottom portion of each bed and downwardly through the top portion of each filter bed.

The filtered oil is removed through perforated pipes 34 and 38 (Fig. 3) which are imbedded in each of the filter beds and this filtered oil is removed under pressure via manifold 42 and may be passed directly to a conventional catalytic cracking unit (not shown). Since pressure is applied from both sides of the filter beds, they are maintained rigid or stationary so as not to break the filter cakes as they form on the top and bottoms of each filter bed during the filtration step. As the filtering proceeds the filter cake builds up on the top and bottom portions of each filter bed and the pressure drop through the filter or vessel 17 increases. When the pressure drop reaches about 75 to 125 p. s. i., which will correspond to time of filtration step of about 8 to 48 hours, valve 11 in line 10 is closed, the filtration is stopped in this unit and the oil to be treated is preferably passed to another similar filtering unit via lines 74 and 76. The vessel 17 is drained as described above.

Then high temperature steam at a temperature of about 500° to 600° F. and at a pressure of about 100 to 125 p. s. i. g. is introduced into the bottom portion of vessel 17 through gas line 58. The steam or other heated gas as it passes up through the filtering beds at a superficial velocity of about 0.5 to 4 feet per second breaks up the filter cakes by agitating the filter beds and this causes intimate mixing of the filter cake particles within the filter beds. The blowback or introduction of steam is continued for about ½ to 2 hours. A more detailed description of blowback procedure is given hereinbefore.

The filter beds are thus made ready for another filtration step. Before filtration is resumed the filter beds are allowed to settle, and pressure is reapplied to the vessel 17 by closing all drain and vent valves, opening the feed valve 11 and slowly opening valve 41 in line 42.

The steps of filtration and remaking of the filter beds may be repeated until the initial pressure drop across the filter exceeds 20 p. s. i. or until the concentration of contaminant in the bed results in the washing of contaminant from the bed into the filtrate. At this time the filtering material of all the filtering beds is discarded and fresh filtering material such as sand is supplied to the vessel 17 to form the spaced filtering beds. By using the plurality of filtering beds a much smaller filtering vessel is needed than would be the case if the oil were passed through a single bed of sand or other filtering material.

One design for practicing the present invention for treating about 40,000 barrels per day of oil is as follows.

The feed oil which is a West Texas gas oil having an initial boiling point of about 450° F. or higher is heated to about 600° F. and put under a pressure of about 100 p. s. i. g. The gas oil contains about 0.2 to 1.0 lb. per 1,000 barrels of iron contaminant. The vessel 17 has an internal diameter of 11 feet and a length of 22 feet, 6 inches, on the straight sides, that is, on a straight line along the side of the vessel from the top of the bottom rounded portion 46 to the bottom of the top rounded portion 44 of the vessel. The material forming the beds 18 consists of closely sized particles such as finely ground sand or other suitable material such as diatomaceous earth, mullite or refractory alumina having a particle size of about 50 to 90 microns. There are 13 perforated plates 22. The bed of sand on each perforated tray 22 is about 8" high. The perforated plates 22 may be made of 325 mesh screen or any screen sufficiently small to retain the bed.

The pressure in vessel 17 is about 200 p. s. i. g. throughout the filtration cycle. At the start of a cycle, the pressure drop through the filter will be low, and valve 41 may be used to reduce the pressure on the oil feed to catalytic cracking. As the run proceeds, the filter pressure drop increases and valve 41 can be opened further to maintain a constant oil pressure at the cracking unit. The filtration step is continued for about 8 hours and the filtration rate is about 30-35 gallons per hour per square foot of filtering surface. The filtered oil from which about 90% of the iron contaminant has been removed is withdrawn by means of the outlet lines 34 to outside manifold 42 and preferably passed to a conventional catalytic cracking unit such as a fluid unit (not shown) to crack the oil. As the filter unit is at about 600° F., advantage is taken of this heat content of the oil and the filtered oil is passed directly to the fluid catalytic cracking unit where heat of vaporization and cracking are supplied by the hot regenerated catalyst. The temperature of cracking is about 850° F. to 1000° F.

and the temperature of the regenerated catalyst is about 1000° F. to 1150° F.

The filter vessel 17 is then taken off stream, excess oil is removed from the vessel 17 by means of oil drain pipes 66, and vessel 17 is then depressurized. For this design steam at a temperature of 600° F. and under pressure of about 125 p. s. i. g. is introduced into the bottom of the vessel 17 through line 58 to agitate the sand beds, break up the filter cakes and disperse the filter cake particles within the sand beds. This blowing or backwashing with steam is continued for about three quarters of an hour. The steam is then shut off, the filter beds are allowed to settle, pressure is reapplied to the vessel 17 and filtration is again resumed in the vessel 17.

What is claimed is:

1. A process for treating hydrocarbon oil containing impurities which comprises introducing a hydrocarbon oil at elevated temperature and under superatmospheric pressure above and below stationary horizontal beds of inert finely divided solid filtering material arranged in vertically spaced parallel relation in a contacting zone, so that the oil passes up through the bottom portion of each bed and down through the top portion of each bed, withdrawing filtered oil from the interior portion of each bed, continuing introduction of oil into said beds until there is an undue increase in pressure drop, stopping the flow of oil through said filtering material and agitating the beds to reconstitute them before again starting the flow of oil to be filtered by passing a liquid upwardly through said contacting zone to remove solid filter particles from said contacting zone.

2. An apparatus for treating oil which includes a vertical tower provided with spaced horizontally extending vertically spaced perforated plates supporting beds of finely divided inert filtering solids, an oil inlet line, distributing pipes extending into the spaces between said beds in said tower and communicating with said oil inlet line for introducing oil into said spaces, perforated pipe means imbedded in said filtering beds for removing filtered oil from said beds, and drain pipes arranged at the side of said tower for the removal of filtering solids from said plates, said perforated plates being slightly tilted toward said drain pipes to facilitate removal of filtering solids from said tower.

3. A process for treating hydrocarbon oil containing impurities which comprises introducing a hydrocarbon oil at elevated temperature and under superatmospheric pressure above and below stationary horizontal beds of inert finely divided solid filtering particles, said beds being arranged in vertically spaced parallel relation in a contacting zone so that the oil to be treated passes up through the bottom portion of each stationary bed and down through the top portion of each stationary bed, withdrawing treated hydrocarbon oil from the interior portion of each bed from said process, continuing introduction of oil into said beds until there is an undue increase in pressure drop, then stopping the flow of oil through said beds, draining oil from said contacting zone, and then agitating and disrupting said beds by fluidizing the particles in said beds to reconstitute said beds in situ by passing hot liquid upwardly through said beds, then stopping the flow of said hot liquid, and then allowing the finely divided solids to settle in each of said beds before again starting the flow of oil to be treated.

4. An apparatus for treating oil which includes a vertical tower provided with vertically spaced horizontally extending perforated plates supporting stationary beds of finely divided inert solid filtering particles, a valved oil inlet line, distributing pipes extending into said spaces between said beds in said tower and communicating with said oil inlet line for introducing oil into said spaces, an oil outlet line, perforated pipes imbedded in said filtering beds and communicating with said oil outlet line for removing filtered oil from said filtering beds, a valved pipe communicating with said oil inlet line for the introduction of fluidizing medium between said filtering beds at intervals selected for physically reconstituting said inert finely divided solids in each of said filtering beds in situ by upward passage through said beds of a fluidizing medium at a fluidizing velocity for agitating and remixing of said inert solids in said beds and drain pipes arranged at the side of said tower for removal of filter solid particles from said plates.

5. A process for treating hydrocarbon oil containing impurities which comprises introducing a hydrocarbon oil at elevated temperature and under superatmospheric pressure at a plurality of spaces above and below stationary horizontal beds of inert finely divided solid filtering particles, said beds being arranged in vertically spaced parallel relation in a contacting zone and extending across the entire cross section of said contacting zone so that the oil to be treated passes from said spaces up through the bottom portion of each stationary bed and down through the top portion of each stationary bed, withdrawing treated hydrocarbon oil from the interior portion of each stationary bed from said process, continuing introduction of oil into said beds until there is an undue increase in pressure drop, then stopping the flow of oil through said beds, draining oil from said contacting zone, and then agitating and disrupting said beds by fluidizing the particles in said beds to reconstitute said beds in situ by introducing a hot fluid into said spaces between said beds for upward passage through said beds at a fluidizing velocity, then stopping the flow of said hot fluid between said beds and allowing the finely divided solids to settle in each of said beds before again starting the flow of oil to be treated.

6. A process for treating hydrocarbon oil containing impurities which comprises introducing a hydrocarbon oil at elevated temperature and under superatmospheric pressure above and below stationary horizontal beds of inert finely divided solid filtering particles having a particle size between about 50 and 90 microns, said beds being arranged in vertically spaced parallel relation in a contacting zone so that the oil to be treated passes up through the bottom portion of each stationary bed and down through the top portion of each stationary bed, withdrawing treated hydrocarbon oil from the interior portion of each bed from said process, continuing introduction of oil into said beds until there is an undue increase in pressure drop, then stopping the flow of oil through said beds, draining oil from said contacting zone, and then agitating and disrupting said beds by fluidizing the particles in said beds to reconstitute said beds in situ by introducing a hot gas between said filter beds for upward passage through said beds at a superficial velocity between about 0.5 and 4.0 feet per second, then stopping the flow of said hot gas between said beds and allowing the finely divided solids to settle in each of said beds before again starting the flow of oil to be treated.

7. An apparatus for treating oil which includes a vertical tower provided with vertically spaced horizontally extending perforated plates supporting stationary beds of finely divided inert solid filtering particles, a valved oil inlet line, distributing pipes extending into said spaces between said beds in said tower and communicating with said oil inlet line for introducing oil into said spaces, an oil outlet line, perforated pipes imbedded in said filtering beds and communicating with said oil outlet line for removing filtered oil from said filtering beds and a valved pipe communicating with said oil inlet line for the introduction of a fluidizing medium between said filtering beds at intervals selected for physically reconstituting said inert finely divided solids in each of said filtering beds in situ by upward passage through said beds of a fluidizing medium at a fluidizing velocity for agitating and remixing of said inert solids in said beds.

8. An apparatus for treating oil which includes a vertical tower provided with vertically spaced horizontally extending perforated plates extending entirely across the horizontal cross section of said tower and each supporting a bed of finely divided inert solid particles, a valved inlet line, distributing pipes extending into said spaces between said beds in said tower and communicating with said oil inlet line for introducing oil into each of said spaces, an oil outlet line, perforated pipes imbedded in each of said beds of finely divided solids and communicating with said oil outlet line for removing oil from each of said beds and from said tower and a valved pipe communicating with said oil inlet line for introduction of a fluidizing medium into said spaces at selected intervals for physically reconstituting said beds of finely divided solids.

References Cited in the file of this patent

UNITED STATES PATENTS

| | | |
|---|---|---|
| 1,015,326 | Kiefer | Jan. 23, 1912 |
| 1,017,867 | Goldman | Feb. 20, 1912 |
| 2,154,434 | Bond | Apr. 18, 1939 |
| 2,171,377 | Tears | Aug. 29, 1939 |
| 2,571,380 | Penick | Oct. 16, 1951 |
| 2,572,433 | Bergstrom et al. | Oct. 23, 1951 |

FOREIGN PATENTS

| | | |
|---|---|---|
| 464,661 | Great Britain | Apr. 22, 1937 |